April 23, 1940.  J. M. GWINN, JR  2,198,495
AIRCRAFT
Filed Aug. 10, 1937
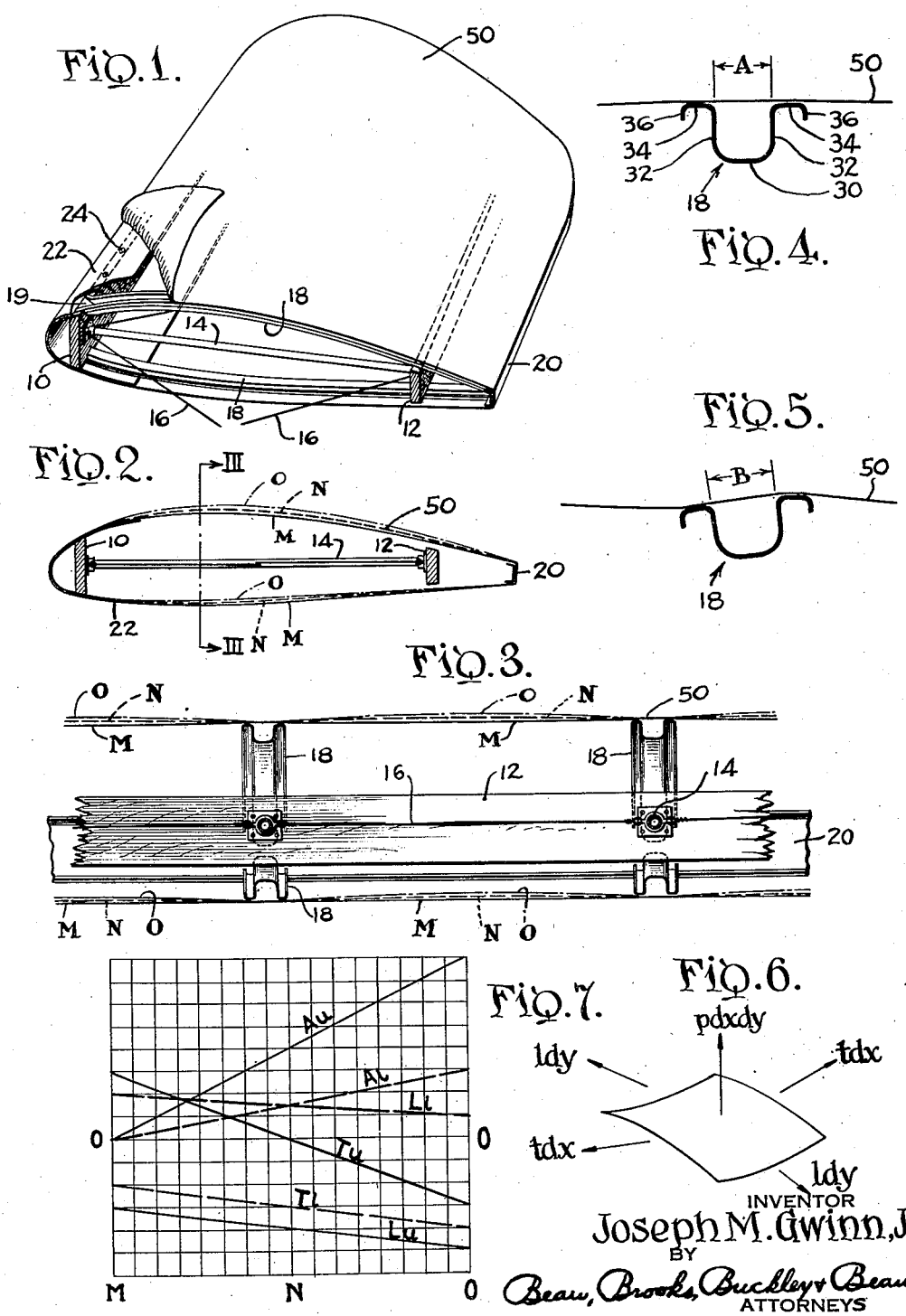
INVENTOR
Joseph M. Gwinn, Jr.
BY
Beau, Brooks, Buckley & Beau
ATTORNEYS Patented Apr. 23, 1940

2,198,495

UNITED STATES PATENT OFFICE 2,198,495

AIRCRAFT

Joseph M. Gwinn, Jr., Buffalo, N. Y.

Application August 10, 1937, Serial No. 158,367

8 Claims. (Cl. 244—132)

This invention relates to aircraft and it has particular relation to the construction of fabric covered elements of an aircraft such as wings, fuselage, fins, and control surfaces.

One object of the invention is to provide an improved aircraft construction of superior strength to weight ratio.

Another object of the invention is to provide an improved and simplified aircraft skeleton structure.

Another object of the invention is to provide an improved and simplified method of attaching fabric covering to aircraft structure that is simple and economical with reference to labor and material used, and provides a structure through which load forces are evenly distributed and efficiently transmitted.

Another object of the invention is to provide an improved method of aircraft construction which is particularly adaptable to commercial production purposes because of simplicity of design and ease and simplicity of construction and assembly.

In aircraft structures the strength to weight ratio depends upon the exactness with which the structure is designed. It is conventional manufacturing practice to design fabric supporting framework in accord with the faulty assumption that the external loads on the frame members are of the same amount, distribution and direction as the external air loads. For example, in the case of fabric covered wings this assumption gives a conclusion as to rib load distribution which is too far removed from the actual distribution to produce a safe and economical rib design; and to overcome the defects of rib design calculations based upon this assumption it has been the custom to assume the existence of additional arbitrary loads.

According to conventional production methods for fabric covered aircraft structure the framework is usually assembled and finished in one department and then forwarded to another department where the covering is applied as a separate step in the manufacturing process. The fabric is usually machine and hand sewn to fit over the skeleton, and is then fastened in place by lacing it to the formers. The fabric is then treated with chemical preparations called dope comprising cellulose nitrate or cellulose acetate products, to tighten and strengthen the fabric and to make it air-tight and water-proof. These fabric treating preparations are chemically incompatible with respect to the oil paints or finishes of the oxidizing type which are usually applied to the skeleton structure, thus precluding the possibility of an effective adhesion of the covering directly to the skeleton and requiring lacing and/or other mechanical attachment means to resist displacement of the covering from the frame work.

The present invention is exemplified by a design for an airplane wing including a skeleton comprising a particularly effective arrangement of spars and rib sections requiring a minimum amount of material. By use of analyses based upon true conditions of loading upon the ribs the rib sections are so designed as to eliminate the necessity of shear bracing between the upper and lower contour forming members which would otherwise increase the weight and obstruct the interior of the wing. The skeleton members of the wing are finished with a coat of material which provides a perfect bond to the metal and/or wooden elements of the skeleton structure, and which is adapted to subsequently receive an application of dope or wing covering treating material of the lacquer variety in cohering bonded relation. Before the dope is applied, the wing covering fabric is drawn over the wing, and the subsequent application of dope simultaneously provides a bond between the fabric and the elements of the wing skeleton and a wing covering treatment serving to tighten and strengthen the fabric and to make it air-tight and water-proof. No lacing of the fabric to the wing skeleton is required. The covering fabric and the rib members are structurally correlated in such manner that the rib members are braced and strengthened by the fabric to increase the strength of the structure and reduce the weight of materials required.

In the drawing:

Fig. 1 is a fragmentary perspective of a wing panel constructed in accordance with the invention;

Fig. 2 is a diagrammatic section through the wing panel showing the covering fabric between rib sections in different positions;

Fig. 3 is a fragmentary longitudinal section, on a larger scale, taken substantially along line III—III of Fig. 2;

Fig. 4 is a diagrammatic section, on a larger scale, of a rib member;

Fig. 5 is a diagrammatic section similar to Fig. 4 and showing the twisting effect of an axial compression load on a rib member;

Fig. 6 is a diagram of the forces acting upon a unit area of wing covering fabric, and Fig. 7 is a graphical illustration of the relation between external air loads and tension forces in the wing covering fabric.

The externally applied loads acting upon a rib member of a fabric covered airplane wing are applied by means of the fabric tension and the principal ones may be classified as follows:

(1) Compressive forces acting in a fore and aft direction due to fore and aft tension in the covering tending to draw the wing leading and trailing edges together;

(2) Forces acting normal to the rib contour due to: (a) fore and aft fabric tension in the strip of fabric that is in direct contact with the rib, acting through fore and aft curvature of the fabric. (This force is very small and is unchanged with changes in air forces on the wings, and for all pratical purposes may be disregarded.) (b) Transverse fabric tension acting through the transverse curvature of the fabric.

Under every condition of air load the fabric tension forces and the externally applied air forces are in equilibrium as illustrated by Fig. 6, and according to the approximate formula:

$$1 dy \frac{d^2z}{dx^2} dx + t dx \frac{d^2z}{dy^2} dy + p\, dx\, dy = 0$$

wherein $x$, $y$, and $z$ are the fore and aft, spanwise, and perpendicular coordinates, respectively, of the fabric at any point; $p$ is the unit air pressure; $1$ is the unit fore and aft fabric tension; and $t$ is the unit transverse fabric tension.

Fig. 7 illustrates the variation of the magnitudes of the terms of the above formula with fabric deformation, wherein $L_u$ and $L_l$ designate the term $$1 dy \frac{d^2z}{dx^2} dx$$

as applied to the upper and lower wing contours, respectively; $T_u$ and $T_l$ designate the term $$t dx \frac{d^2z}{dy^2} dy$$

as applied to the upper and lower wing contours, respectively; and $A_u$ and $A_l$ designate the term $p\, dx\, dy$ as applied to the upper and lower wing contours, respectively. The fabric deformation assumed is from position M through position N to position O (Figs. 2, 3 and 7).

The magnitudes of the forces acting upon a rib member vary with different conditions of air load. The compressive fore and aft force is approximately equal to:

$$\int_{-\frac{w}{2}}^{\frac{w}{2}} 1\, dy$$

The unit load normal to the rib contour is approximately to:

$$\int_{-\frac{w}{2}}^{\frac{w}{2}} t dx \frac{d^2z}{dy^2} dy$$

wherein $w$ equals the distance between ribs.

The unit load normal to the contour former will have the same general variation as the term $$t dx \frac{d^2z}{dy^2} dy$$

On the upper former it varies in a manner similar to $T_u$, (Fig. 7), from a downward load under zero air load (position M, Figs. 2, 3, and 7), toward and through zero (position N) under increasing air load until it becomes an upward load as the wing covering fabric moves toward a position outside of the wing rib contour, such as position O (Figs. 2, 3, and 7). Thus it is seen that within a given range of working loads the load normal to the contour on the upper rib is less than its initial load. On the lower former it varies in a manner similar to $T_l$ (Fig. 7) from an upward load under zero air load (position M) to increasingly larger upward loads as the wing covering fabric moves toward position O.

As is already well known, the air load against the lower surface of a wing is much less than the air load upon the upper wing surface, and therefore the increase in upward load on the lower former is not important. On the other hand, it is seen that the magnitude of the fore and aft tension in the wing covering increases directly with air load and that therefore the predominant loads on the rib members are axial compression loads. This is because the fabric between rib sections, being drawn upwardly toward positions N and O, follows an increasingly longer fore and aft line of contour. Hence the tension in the longitudinal fibers of the fabric is increased, beginning with movement from the position M, and under actual flying conditions the magnitude of the longitudinal fabric tension in relation to the magnitude of transverse fabric tension is much greater than was previously supposed.

For these reasons a rib section should be designed primarily to resist longitudinal axial compression loading, and if the principles of this invention are utilized internal trussing or bracing may be entirely dispensed with, thus increasing the strength to weight ratio and reducing the problems and expense of manufacture.

As shown in Fig. 1, the wing skeleton framework includes a front spar 10 and a rear spar 12 which may be made of wood, or any other suitable material. The spars are spaced and braced by struts 14 and diagonal wires 16 in the manner of a Pratt truss, the struts 14 being preferably in the form of tubes designed particularly to take column compression loads between the spars. The wires 16 provide lateral bracing for the wing.

The spars also provide anchor points for upper and lower contour formers 18 extending between the front spar 10 and a trailing edge strip 20 of channel form.

The ribs 18 are designed particularly to withstand longitudinal compressive forces and the small normal loadings $T_u$ and $T_l$ as explained above without the aid of web or bracing elements therebetween, and to support the wing covering vertically in proper wing section contour. The front spar 10 also provides an anchor for a nose piece 22 formed of metal or wood, or any other suitable material, and fastened to the spar as by means of screws 24. The nose piece forms the contour of the leading edge of the wing and braces the latter against lateral and torsional stresses.

The forward ends of the former ribs 18 are connected, as indicated at 19, to the front spar 10, and are thus anchored against both longitudinal and vertical relative movement. The former rib elements 18 are connected rigidly, as indicated at 20, to the rear spar 12. These former rib elements are of generally U-shaped section, (Figs. 4 and 5) and each comprises a base portion 30, parallel side portions 32, and opposite laterally extending flange portions 34 which terminate in downturned edge portions 36. The flange portions 34 provide a pair of flat upper surfaces to support wing covering material 50 in proper wing section contour.

In constructing a wing, the wing skeleton comprising the spars 10, 12, the struts 14, the diagonal wire bracing 16, the former ribs 18, the nose piece 22, and the trailing edge strip 20 are assembled in complete form and the structure is coated with a primer coat of such character as to provide a particularly good adhesion or bond to the metallic and/or wooden elements of the wing skeleton and to take a finishing coat of lacquer to complete a preservative coating for the structure. The primer and second coat, employing similar vehicles, cohere perfectly. It will be apparent that in connection with the assembly of my wing skeleton, the spars 10 and 12 and the struts 14, and wires 16 may be assembled and trued in final form before the former ribs 18 are installed by simple connection from above and from below the frame. As distinguished from this, in the case of previous forms of construction wherein the upper and lower rib contour elements are joined by web or bracing elements, the rib assemblies must be slid longitudinally of the spars to their approximate proper locations prior to the installation of the internal bracing between the spars. Assembly of wing skeletons of these previous types therefore involves laborious and complicated operations, increasing the expense of manufacturing the structure.

The wing covering 50 in the form of fabric material such as cotton or linen is first machine sewn to fit the wing skeleton and is pulled over the wing frame from tip to root and temporarily held in position thereby by any suitable means. A suitable dope, also employing a similar vehicle is then applied to the fabric covering, and the areas of contact between the fabric covering and the structural members of the wing skeleton are saturated with the dope material so as to penetrate between the threads and fibers of the fabric and to unite with the lacquer coating previously applied to the skeleton members. The dope partially dissolves the surface of the lacquer, and upon drying provides a perfect bond between the covering fabric and the adjacent surfaces of the wing skeleton. This method of wing covering dispenses with the need of any additional lacing or tacking of the wing covering to the wing skeleton to maintain the connection between the covering and the skeleton during service conditions. The fore and aft tension of the fabric holds the fabric firmly against the outer surfaces of the spaced formers during the bonding operation, thus dispensing with the need of externally applied pressure such as are usually required in connection with ordinary cementing operations. Also, subsequent applications of dope will temporarily soften the cemented bond between the fabric and the formers permitting the fabric to readjust itself relative to the skeleton as it tautens under influence of the dope. The bond subsequently becomes firm as the dope dries, and thus an equalization of fabric tension is automatically obtained throughout the structure. Thus the expense and disadvantages associated with lacing and tacking of the wing covering to the skeleton are obviated, and a completed structure of increased strength is provided by reason of the fact that the covering material is uniformly and evenly attached to the surfaces of the rib and spar sections without break of continuity, as distinguished from a series of spaced attachments.

The cementation of the wing covering to opposite flanges 34 of the rib elements closes the channeled portion of the latter and provides an additional bracing thereof. Thus the combined rib element and fabric provide a box girder structure wherein the covering material extending between the opposite flanges of the rib resists any tendency of the rib to open up (as illustrated in Fig. 5) under torsion forces such as are generated by column loading of the rib. For example, as illustrated in Fig. 4, the normal dimension between the opposed flange portion 34 is represented by A. When the rib is subjected to end compression forces, such as results from tension between the leading and trailing edges of the wing panel, a portion of the load is resolved into torsional forces tending to rotate the rib sectionally and to increase the opening between the side portions 32 as indicated by B in Fig. 5. The cohesion of the wing covering material to the flange surfaces 34 tends to maintain the flange sections 34 in their original relative position, thus increasing the strength of the rib member without correspondingly increasing the amount of material in the rib member. Also, the fabric contributes to the further strength of the rib in bending where bending loads are imposed upon the rib in such manner as to produce tension on the fabric side of the box girder.

Although only one form of the invention has been shown and described in detail, it will be apparent to those skilled in the art that the invention may be applied with equal facility to other aircraft structural elements and is not so limited but that various changes can be made therein without departing from the spirit of the invention or from the scope of the appended claims.

I claim:

1. A method of covering an aircraft frame structure having a plurality of spaced outwardly surfaced former elements which comprises applying a pliable fabric covering in contact with the outer surfaces of the former elements and extending therebetween, and cementing the fabric to the outer surfaces of the former elements in continuously bonded relation, by means of a fluid cementing substance applied to the outer surface portions of said fabric and penetrating said fabric to provide an adhesive bond between said fabric and said former element outer surfaces.

2. A method of applying a pliable and porous covering to an airplane frame structure having spaced outwardly surfaced former elements which comprises coating the outer surfaces of said former elements with dope soluble substance, applying the covering over the frame structure in contact with the coating of the outer surfaces of said former elements, and bonding the covering to the outer surfaces of said former elements by applying dope through the covering in penetrating and cementing relation with the coating on the surfaces of said former elements.

3. A method of covering an aircraft frame structure having spaced outwardly surfaced former elements which comprises coating the outer surfaces of the former elements with a nitrocellulose lacquer, applying a pliable and porous covering over the frame structure in contact with the lacquer coated outer surfaces of said former elements, and applying a nitrocellulose covering treating substance upon and through the covering into bonded relation with the lacquer.

4. A method of covering an airplane wing structure having spaced outwardly surfaced rib elements which comprises applying a primer coating to the outer surfaces of the rib elements, coating the primer coated outer surfaces of the rib elements with a dope soluble lacquer, applying a pliable and porous covering over the wing structure in contact with the lacquer coated rib elements, and applying a covering treating dope upon and through the covering into bonded relation with the lacquer coating.

5. In an airplane wing structure, upper and lower rib elements of outwardly open channeled form, spars transversely connecting the rib elements adjacent opposite ends of the latter, leading edge and trailing edge members connected to the rib elements, each of said rib elements having a pair of spaced outer covering receiving surfaces, pliable wing covering material mounted upon said surfaces and closing the channel openings of said rib elements, and cementing means bonding the covering directly to the outer surfaces of the rib elements whereby each of the rib elements together with its adjacent portion of the covering constitutes a closed section element.

6. An airplane wing structure comprising essentially a plurality of spaced upper and lower rib elements transversely connected to leading edge and trailing edge and spar members, said rib elements having outer covering receiving surface portions, fabric wing covering material enveloping said structure and disposed in abutting contact with said covering receiving surfaces, and means simultaneously coating said covering material and impregnating and cementing the latter directly to said covering receiving surfaces in continuously bonded relation thereon.

7. In an airplane wing structure, spaced leading edge and trailing edge elements, a wing covering of pliable material mounted upon said leading and trailing edge elements, spaced rib members disposed between said leading and trailing edge elements for bracing the latter against relative movement toward each other and having outer covering receiving surfaces for supporting said wing covering in wing contour position, and means simultaneously coating and impregnating and cementing said covering directly to said outer surfaces of the rib members in continuously bonded relation.

8. In an airplane wing structure, a wing covering supporting rib of outwardly open channel section comprising essentially a web portion and a pair of spaced opposed side wall portions extending substantially normal to the plane of said web portion and of said wing covering and an ear portion extending laterally and outwardly from each of said wall portions at the outer ends thereof to provide wing covering receiving surfaces, pliable wing covering material disposed upon said receiving surfaces and across the channel opening for closing the latter, and means attaching said covering directly to said covering receiving surfaces, whereby said rib and said covering combine to constitute a hollow closed section structural element of said wing.

JOSEPH M. GWINN, JR.